(12) United States Patent
Boegner et al.

(10) Patent No.: US 12,478,049 B2
(45) Date of Patent: Nov. 25, 2025

(54) DEVICES FOR THE VOLUNTARY SELF-SORTING OF LIVE AQUATIC ANIMALS (71) Applicant: Alfred-Wegener-Institut, Helmholtz-Zentrum fuer Polar- und Meeresforschung, Bremerhaven (DE)

(72) Inventors: Mirko Boegner, Bremerhaven (DE); Amirhossein Karamyar, Bremerhaven (DE)

(73) Assignee: ALFRED-WEGENER-INSTITUT, HELMHOLTZ-ZENTRUM FUER POLAR- UND MEERESFORSCHUNG, Bremerhaven (DE)

( * ) Notice: Subject to any disclaimer, the term of this patent is extended or adjusted under 35 U.S.C. 154(b) by 0 days.

(21) Appl. No.: 18/256,050

(22) PCT Filed: Dec. 8, 2021

(86) PCT No.: PCT/DE2021/100984
§ 371 (c)(1),
(2) Date: Jun. 6, 2023

(87) PCT Pub. No.: WO2022/122084
PCT Pub. Date: Jun. 16, 2022

(65) Prior Publication Data
US 2024/0107987 A1    Apr. 4, 2024

(30) Foreign Application Priority Data

Dec. 11, 2020    (DE) ............ 10 2020 133 105.3

(51) Int. Cl.
*A01K 61/00*    (2017.01)
*A01K 1/00*    (2006.01)
(Continued)

(52) U.S. Cl.
CPC ............ *A01K 61/95* (2017.01); *A01K 1/0023* (2013.01); *A01K 63/006* (2013.01)

(58) Field of Classification Search
CPC ................................ A01K 61/90; A01K 61/95
See application file for complete search history.

(56) References Cited

U.S. PATENT DOCUMENTS 2,690,158 A    9/1954    Petty
4,095,092 A    6/1978    Neff
(Continued)

FOREIGN PATENT DOCUMENTS

CN    110946106 A    4/2020
DE    102010021606 B4    4/2012
(Continued)

*Primary Examiner* — Joshua J Michener
*Assistant Examiner* — Henry Hooper Mudd
(74) *Attorney, Agent, or Firm* — LEYDIG, VOIT & MAYER, LTD.

(57) ABSTRACT

A device for voluntary self-sorting of live aquatic animals, including at least one passage device, by which a water tank is divided into a passage-facilitating region and a passage-obstructing region. The at least one passage device has a plurality of passage openings that can be adapted in size to the aquatic animals to be sorted. Guides are arranged towards the passage-facilitating region and retainers are arranged towards the passage-obstructing region on the passage device. The guides are configured as climbing aids and the retainers are configured as circular walls, which are adapted to a contour of the passage openings. The passage openings are flat and arranged in a carrier plate, and have a height that is larger than a height of the aquatic animals to be sorted.

18 Claims, 7 Drawing Sheets (51) Int. Cl.
*A01K 61/95* (2017.01)
*A01K 63/00* (2017.01)

(56) References Cited

U.S. PATENT DOCUMENTS

| | | | |
|---|---|---|---|
| 2013/0192531 A1 | 8/2013 | Krone et al. | |
| 2015/0250149 A1* | 9/2015 | Gronkowski | A01K 63/00 |
| 2020/0375154 A1* | 12/2020 | Morishima | A01K 61/50 |
| 2022/0030836 A1 | 2/2022 | Boegner et al. | |

FOREIGN PATENT DOCUMENTS

| | | | | |
|---|---|---|---|---|
| DE | 102018130232 B3 | 11/2019 | | |
| KR | 100905175 B1 * | 6/2009 | | A22C 25/04 |
| WO | WO 2014/198556 A1 | 12/2014 | | |

\* cited by examiner

DEVICES FOR THE VOLUNTARY SELF-SORTING OF LIVE AQUATIC ANIMALS

CROSS REFERENCE TO RELATED APPLICATIONS

This application is a U.S. National Phase application under 35 U.S.C. § 371 of International Application No. PCT/DE2021/100984, filed on Dec. 8, 2021, and claims benefit to German Patent Application No. DE 10 2020 133 105.3, filed on Dec. 11, 2020. The International Application was published in German on Jun. 16, 2022 as WO 2022/122084 A1 under PCT Article 21(2).

FIELD

The invention relates to a device for the voluntary self-sorting of live aquatic animals, and to methods of applying the sorting device.

BACKGROUND

Besides fish, aquatic animals include in particular crustaceans (Crustacea) or crabs. With at least 52,000 recently known species worldwide, they form a subphylum with a great diversity of forms within the arthropods (Arthropoda). Crustaceans used in cooking are also called shellfish and are a valuable food because they are rich in protein. Larger crustaceans include mainly lobsters and lobster-like creatures, spiny lobsters, crayfish and shrimp. Shrimp (fresh and salt water) are different species of bottom-dwelling or free-swimming crustaceans. Shrimp (also called prawns, king prawns, gambas, scampi, crevettes, common shrimp, crangon crangon or North Sea shrimp) from different family groups are highly valued as delicacies. They are fished commercially or reproduced in land-based or water-based aquacultures.

An essential problem in the production of brine shrimp, for example, is the uneven growth of the animals, which leads to an increase in cannibalism, to untargeted feeding or uneven product size. These effects can be prevented by sorting the animals. However, previous sorting methods are very invasive and cause high levels of stress in the shrimp, which respond very sensitively to physical disturbances. The animals die or injure themselves very often and can even jump out of the water tank. These disadvantages are often so severe that sorting is not carried out in the body of water. For the sorting of live shrimp, the animals are currently rounded up, often taken out of the water and sorted in the air. For this purpose, either simple boxes with a defined slot size or roller sorting systems are used. The shrimp are taken out of the holding tank and sieved through this box. All animals that are too small fall through the bars. For the roller sorting systems, the animals are taken out of the water and sorted via rollers. The space between the rollers is continuously increased, with smaller shrimp falling through first and larger shrimp later. The sorting procedure nowadays, regardless of the method used, is very labour-intensive and requires human resources. In addition, there are investment costs for technical equipment to crowd the animals together as well as for the sorting system itself. Moreover, there is a high risk of injury for the animals.

U.S. Pat. No. 4,095,092 A discloses a generic device for counting and sorting live aquatic animals, explicitly fish. A passage device that can also be arranged vertically divides a water tank into two regions. Since the known device is primarily used to count fish, it can be assumed that once fish have swum through from one region into the other, they should not swim back. The one region can therefore be called passage-facilitating (the fish should voluntarily swim from here through the passage device) and the other can be called passage-obstructing (the fish should not swim from here through the passage device). The passage device comprises a carrier plate with circular passage openings. Flexible, narrow contact springs are placed over the diameter of the passage openings, which is part of a switch. When the fish swims through, the contact spring is bent open and a signal is generated by the opening of the switch. The contact spring then springs back to its original position and closes the switch. It is not possible to deflect the contact spring in the other direction so that the fish are prevented from swimming back. However, smaller fish can swim sideways past the contact spring. Frustoconical guide elements intended to guide the fish to the passage openings are located on the passage device towards the passage-facilitating region. A bar grid is arranged in front of the guide elements used to pre-sort the fish according to size. The frustoconical guide elements, in relation to the bar grid, are also intended to prevent fish from getting caught behind it. The effective diameter of the passage openings can be varied by displaceable cross bars, which can be moved over the passage openings in a secant-like manner.

It is known for a passage device from U.S. Pat. No. 2,690,158 A to design the passage openings to be funnel-shaped such that they extend from a passage-facilitating region (larger diameter) to a passage-obstructing region (smaller diameter). It is known for a similar passage device from US 2015/0250149 A1 to arrange non-return valves or funnels towards the passage-obstructing region on the side of the passage openings.

The provision of climbing aids for crustaceans is known from DE 10 2010 021 606 B4. Here, differently shaped sheets are arranged in various orientations on the underwater section of a wind turbine. In this way, its foundation is supposed to be adopted as a habitat by crustaceans. It is known for a device for the voluntary self-sorting of live fish from DE 10 2018 130 232 B3 to arrange two plates with slot-like openings so that they are displaceable relative to one another. The size of the passage openings can be altered by moving the one plate on the other.

CN 110 946 106 A discloses a device for the voluntary self-sorting of live aquatic animals, in which the guide elements are formed as guide angles from two flat baffle plates, which are hinged to a connection shaft and form a variable inner angle and a corresponding variable outer angle to one another. The outer angle points towards the passage-facilitating region. The inner angle points towards the passage-obstructing region and forms a retaining element. A gap-shaped passage opening is respectively formed between two guide angles arranged next to each other. The inner and outer angle of the hinged baffle plates in a guide angle can be altered with respect to one another via an articulated thrust rod, meaning that the gap width of the passage openings between two adjacent guide angles can be altered.

A sorting device for fish is known from WO 2014/198556 A1, in which a net-like slider rotates against a partition with unidirectional passage openings. This drives the fish against the passage openings. Smaller fish can swim through the passage openings, whilst larger fish are held in the increasingly smaller space between the slider and the partition and have to be removed here. Obviously, the net-like slider is so strong that the smaller fish cannot swim back into the space with the larger fish. Apart from the fact that this is forced, and not voluntary and stress-free self-sorting, no statement is made about the characteristics of the passage openings in the partition.

SUMMARY

In an embodiment, the present disclosure provides a device for voluntary self-sorting of live aquatic animals, comprising at least one passage device, by which a water tank is divided into a passage-facilitating region and a passage-obstructing region. The at least one passage device has a plurality of passage openings that can be adapted in size to the aquatic animals to be sorted. Guides are arranged towards the passage-facilitating region and retainers are arranged towards the passage-obstructing region on the passage device. The guides are configured as climbing aids and the retainers are configured as circular walls, which are adapted to a contour of the passage openings. The passage openings are flat and arranged in a carrier plate, and have a height that is larger than a height of the aquatic animals to be sorted.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a device for the voluntary self-sorting of live aquatic animals such that whilst maintaining the advantages already achieved, other live aquatic animals, in particular crustaceans, use the device completely voluntarily and in a substantially stress-free manner, wherein the sorting function of the device is to be implemented particularly well. Preferred applications of embodiments of the invention are shown.

In an embodiment, a device for voluntary self-sorting of live aquatic animals is provided having at least one passage device, by means of which a water tank is divided into a passage-facilitating region and a passage-obstructing region, and which has a plurality of passage openings that can be adapted in size to the aquatic animals to be sorted, wherein guide elements are arranged towards the passage-facilitating region and retaining elements are arranged towards the passage-obstructing region on the passage device.

According to an embodiment of the invention, it is provided in an embodiment that the guide elements are also designed as climbing aids and the retaining elements are designed as circular walls, which are adapted to the contour of the passage openings and have a height that is larger than the height of the aquatic animals to be sorted, and wherein the passage openings are flat and arranged in a carrier plate. In this case, the passage device is preferably and advantageously arranged vertically. However, oblique arrangements of the passage device can also be readily implemented provided that the indispensable division between the passage-facilitating and passage-obstructing region in the water tank is maintained.

Unlike fish, who only swim in water, crustaceans also spend part of their time substrate-bound, i.e. they like to swim near substrates or walk around on them. In an embodiment of the invention, the guide elements are arranged such that the aquatic animals can both orientate themselves to them for passage and move directly along them. With the guide elements provided, the crustaceans position themselves directly at eye level in front of the passage openings and can thus pass through them more easily than if they were to encounter the passage openings at an angle or from the side. For crustaceans in particular, the guide elements are also intended as climbing aids, which are preferably and advantageously arranged horizontally. This makes it easy for the crustaceans to position themselves at different heights in the water column or simply walk along and between the climbing aids. However, an oblique arrangement of the climbing aids is also possible. Some crustaceans also preferably walk along the bottom such that they can climb up the passage device from the bottom to the top via the climbing aids. Furthermore, according to an embodiment of the invention, the retaining elements surround the flat passage openings and do not cover or cross them. This allows aquatic animals to pass through the passage openings without being irritatingly touched by the retaining elements. To swim through the passage openings again, the animals would have to turn around at some distance in front of them and swim back again. However, crustaceans in particular preferably orientate themselves to substrates. When passing through the passage opening, they accordingly orientate themselves to the surrounding wall. Once they have reached the end, they continue to walk on the outside or preferably push off into the free body of water. When walking along the outside of the walls, they reach the carrier plate of the passage device and orientate themselves thereto. In doing so, however, they cannot reach other passage openings because these are also surrounded by closed walls, which block the direct access. Since these are also higher than the crustaceans themselves, they would have to consciously change the direction of movement. In addition, the animals find the thin walls relatively sharp-edged. They therefore prefer to circle the walls or run over them and do not reach further passage openings (which look like dark holes at the end of the walls to the animals) through which they could swim back. The surrounding walls can, for example, be designed as pipe sockets adapted in length to the animals and having a constant diameter. A funnel-shaped design with a diameter decreasing from the carrier plate increases the retention effect but is less easy to implement from a design point of view. In addition, the closed walls further reduce the contact and the time the animals spend at the passage openings such that there is no congestion after the passage.

Embodiments of the present invention achieve careful sizing of live aquatic animals, preferably and advantageously in the application in particular crustaceans, particularly preferably shrimp, in land-based aquaculture farming. The principle is based on the voluntary and independent sorting of the animals. The animals are not actively forced through a sorting device or even removed from the water. Embodiments of the invention provide stress-free sorting directly in the holding tank in the water, and no panic is caused meaning that the animals remain uninjured during sorting. Likewise, expensive sorting machines (including those where the animals are temporarily removed from the water) can be dispensed with and staff costs can be significantly minimized. The work involved is limited only to the insertion of the sorting device into the holding tank. The sorting device can also remain permanently in the tank so that continuously smaller animals can leave areas with mixed animal sizes and shrimp of one size can be cultivated together.

According to a configuration of an embodiment of the invention, the climbing aids can preferably and advantageously be plate-shaped or wedge-shaped. In a plate-shaped design, this may involve simple bars or brackets that are mounted on the carrier plate. The climbing aids can run continuously on several levels between the rows of flat passage openings. However, they can also be designed in sections and arranged like stairs on different levels. Finally, they can also be branched. In the prior art, reference was made to the publication DE 10 2010 021 606 B4, which deals specifically with climbing aids and showed many different designs that are suitable for embodiments of the present invention.

In principle, the passage openings should be designed in such a way that the animals fit through them largely snugly but without touching them. The openings are shaped in such a way that sizing can work well, i.e. they should accommodate the body dimensions, especially the height and width of the animals. Both round and oval or even angular shapes are suitable. Therefore, in an embodiment of the invention, the flat passage openings can preferably and advantageously be regularly circular or rectangular or irregular in shape. The limits for the design result from the manufacturability of the carrier plate or the passage openings in the carrier plate. Slot-shaped designs, as known from the prior art, are also possible, as are diamond-shaped or kite-shaped passage openings. Finally, in an embodiment of the invention, the size of the passage openings can preferably and advantageously be adjusted by means of two plates with passage openings, wherein the plates are arranged to be displaceable relative to one another in the passage device. This embodiment can in particular be achieved with a grid unit for sorting fish, as described in detail in the abovementioned DE 10 2018 130 232 B3, wherein the grid unit described there for fish can be seen as similar to the passage device for crustaceans disclosed here. Thanks to the moveability of the two carrier plates with passage openings relative to each other, the effective cross-section of the passage can be easily adapted to the size of the aquatic animals to be sorted. Furthermore, a plurality of grid units can be provided in parallel, which have progressively smaller openings to allow groups of aquatic animals to be collected in different, successive regions. More complex shapes of (effective) passage openings can also be achieved by superimposing corresponding shapes of passage openings.

In an embodiment of the invention, a plurality of flat passage openings are arranged regularly in columns and rows or irregularly on a carrier plate, i.e. in a common plane, in a passage device. If the passage device is inserted into a water tank, the carrier plate fits tightly to the bottom of the water tank, and the first passage opening is at some height above the floor. The remaining, relatively wide bar can prove to be an obstacle in particular for crustaceans, who frequently run on the ground. Therefore and in order to provide a device designed differently from some embodiments of the invention, wherein this is based on the fact that gap-shaped passage openings are formed by angular guide elements arranged next to one another, an embodiment of the invention envisages that the guide elements are designed as angular sections with an invariable inner angle and an invariable outer angle and that the width of the gap-shaped passage openings can be adjusted by the spacing of adjacent angular sections. Thus, an (idealised) "one-dimensionality" of the gap-shaped passage openings can be offered compared to the "two-dimensionality" of the flat passage openings according to some embodiments of the invention. The gap-shaped passage openings extend over the entire height of the passage device (wherein, due to the design, there may be a small bar at the bottom of the water tank) and can be easily passed especially by crustaceans, even when running along the bottom. The guide elements are designed as rigid angular sections, i.e. their inner or outer angle is invariable, and have a tip (outer angle) and an opening (inner angle). A plurality of angular sections are arranged with their tips spaced next to each other. The tips point towards the passage-facilitating region. Incoming crustaceans are guided by the tips of the angular sections in the direction of the gap-shaped passage openings. After passing through, the crustaceans are in the passage-obstructing region. Here, they especially see the wide openings of the angular sections, which are, however, closed in the inner angle. It is only possible for the crustaceans to return to the passage-facilitating region if they thread their way between two adjacent angular sections into the gap-shaped passage opening.

The size and width of the gap-shaped passage openings can be adjusted such that a width adjustment to the aquatic animals to be sorted can take place. However, the height of the passage openings is not limited, or is limited to the height of the passage device such that crustaceans in particular can be easily sorted if they differ characteristically in their growth stage in terms of width. It is therefore provided according to an embodiment of the invention that the width of the gap-shaped passage openings can be adjusted by the spacing of adjacent angular sections. This is a measure that can be implemented well in terms of design. The angular sections are, for example, arranged so that they can be moved along a frame with a slotted hole and are fixed in place with locking screws. The width of the gap-shaped passage openings can then be easily adjusted by moving the angular sections sideways. It makes sense to measure all widths equally. However, different widths can also be implemented if required for other applications of the device.

Since the gap-shaped passage openings can extend almost to the bottom of a water tank, the crustaceans can also pass through whilst running on the bottom or swimming just above it. However, a relatively large number of animals can result in congestion and possible stress or injuries to the animals in front of the gap-shaped passage openings. In accordance with an advantageous and preferred modification of this embodiment, it is therefore provided that the angular sections are also equipped with climbing aids, wherein these can be extended over a plurality of angular sections arranged next to one another. As with some embodiments, the animals can then climb up the passage device. The climbing aids can only be formed by short sections such that the crabs can only pass through the same gap-shaped passage opening at a greater height. However, the climbing aids can also extend over a plurality of adjacent angular sections such that the crustaceans can also switch between the gap-shaped passage openings when climbing. In an embodiment of the invention, the angular sections can also be inserted at an angle into a water tank (wherein an oblique arrangement is possible both in the width and length of the water tank) provided that the separation of the passage-facilitating and passage-obstructing region is maintained by the passage device. Preferably and advantageously, the angular sections can be arranged vertically and/or the climbing aids can be arranged horizontally. The same boundary conditions apply to the climbing aids as for the first embodiment. They can therefore also be arranged at an angle, wherein the degree of slant should still allow the crabs to climb (with buoyancy support).

It has already been explained above that the large openings of the angular sections towards the passage-obstructing region largely prevent aquatic animals from swimming back into the passage-facilitating region. In order to reliably ensure that no animals at all swim back, it is preferable and advantageous according to an embodiment of the invention if the angular sections have flexible brush strips as additional retaining element towards the passage-obstructing region on both sides of the gap-shaped passage openings. These soft brushes (or combs) further narrow the gap-shaped passage openings such that the crabs have to push the flexible brushes aside a little when swimming through. However, given that the pressure of this is very low, this does not irritate or injure the animals. After the animals have swum through, the brushes then reduce or cover the gap-shaped passage opening and reliably prevent the animals from swimming back.

Another important factor for the well-being of the aquatic animals is the unimpeded, highest possible water circulation in the water tank. So that this is not hindered by the use of a passage device, it is preferable and advantageous according to a modification for embodiments of the invention if a flow element is provided in the passage device for water exchange between the passage-facilitating region and the passage-obstructing region, wherein the flow element comprises a passage barrier so that the aquatic animals cannot pass the flow element. The flow element can, for example, be one or a plurality of openings (for example, circular or gap-shaped) outside of the sorting structure of the passage device, but within the passage device, which is covered, for example, with a net as a passage barrier. However, the flow element can also preferably and advantageously be designed as a tube and the passage barrier can be designed as a mesh screen, wherein the tube can, for example, be arranged in the lower region of the passage device.

According to a modification of embodiments of the invention, it can preferably and advantageously be provided that the passage device is modular for adapting to different water tanks. For example, in an embodiment, edge elements can be provided with flat passage openings. Reference should again be made to DE 10 2018 130 232 B3 here, in which the fitting of the carrier plate of the grid unit with a surrounding sealing lip is explained in detail. In an embodiment of the invention, adaptability to various water tank shapes can be achieved relatively easily due to the number of angular sections arranged next to one another. These can also be designed to be assembled as modules in their length in order to also achieve an adaptation of the passage device in the height of the water tank or water column.

Thanks to the provision of a passage device in a water tank, the latter is divided into two regions. In order to obtain more than two regions with graduated sizing, it is preferable and advantageous according to an embodiment of the invention if a plurality of passage devices can be arranged spaced apart in a water tank, wherein the passage openings are formed with decreasing size in the direction of the passage-obstructing regions. The crustaceans swim voluntarily through one or a plurality of passage devices according to their size. The separation of the animals at every passage device always results in a "passage-facilitating region" (non-sorting region) and a "passage-obstructing region" (sorting region). In each case, the passage-obstructing region of the one passage device becomes the passage-facilitating region of the following passage device. The crustaceans sort themselves voluntarily with decreasing size.

The main application for embodiments of a device for the voluntary self-sorting of live aquatic animals according to the invention relates to the self-sorting of crustaceans, in particular shrimp. In numerous laboratory tests carried out by the applicant, it has been demonstrated that embodiments of the present invention produce very good results with high quality standards for the self-sorting of shrimp. Generally, all aquatic animals to be sorted, in particular also the sensitive shrimp, should move voluntarily and largely stress-free from the passage-facilitating region to the passage-obstructing region. It is therefore sensible in a constructive application in a water tank to provide the shrimp with additional incentives to increase the sorting speed, on the one hand, and to largely prevent them from swimming back, on the other. It has proven advantageous if different stimuli for attracting the crustaceans are provided in the at least one passage-obstructing region of the water tank. Here, it can preferably and advantageously be envisaged that the stimuli are formed by a food source, a light source and/or a bright colouring. Depending on their species and genus, the animals are more or less attracted to food, bright light and bright colours found in the water. By contrast, they are repelled by darkness and dark colours. These findings are presented in detail in the publication "Influence of feeding sequence, light and colour on the performance of a self-grading-system designed for turbot (Scophthalmus maximus)" from M. Bogner et al. (in Aquacultural Engineering 77 (2017) 1-8). Based on the findings obtained, it is also beneficial in embodiments of the invention if the passage device has a bright colouring towards the passage-facilitating region and/or a dark colouring towards the passage-obstructing region. The animals are thus enticed from the passage-facilitating region to the passage-obstructing region by the bright colouring, which can advantageously be as it occurs in water, i.e. white, light blue, light yellow or light green, on the front side of the passage device and prevented from swimming back to the passage-facilitating region by the dark colouring, advantageously as it occurs in water, i.e. black, dark blue or dark green, on the back of the passage device. It has since become apparent that shrimp are particularly attracted to bright light and a dark bottom colour.

Finally, other modifications can be provided with the sorting device for live aquatic animals in embodiments of the present invention, see also for example DE 10 2018 130 232 B3. Further explanations of embodiments of the present invention and its modifications addressed can be found in the exemplary embodiments presented below.

EXEMPLARY EMBODIMENTS

The sorting device for live aquatic animals, in particular shrimp, in an embodiment of the present invention and its preferred modifications will be explained in more detail below based on the schematic figures in order to have a better understanding of the invention.

Figures 1A, 1B:
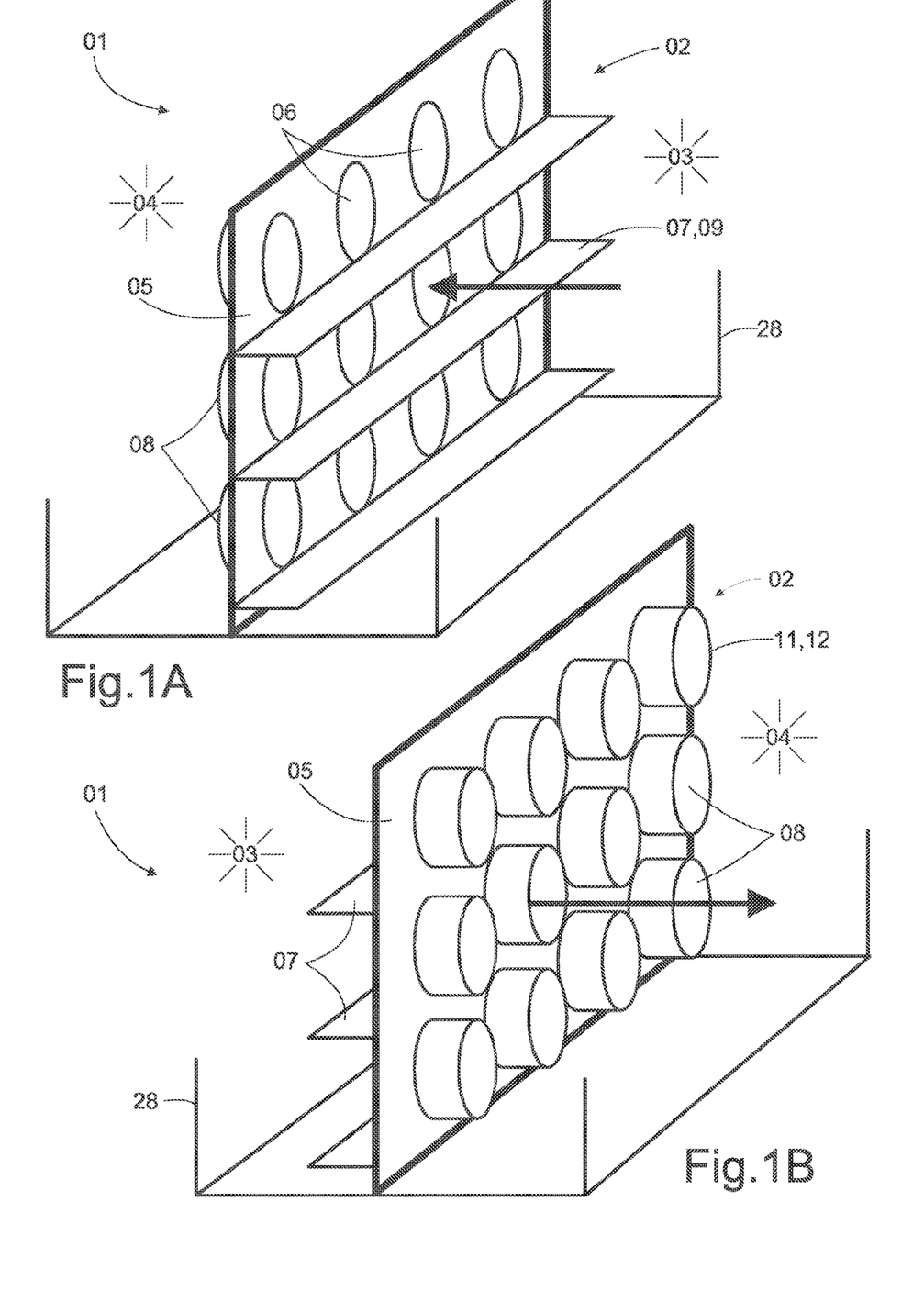
FIGS. 1A to 1D show a sorting device.
Figure 1C:
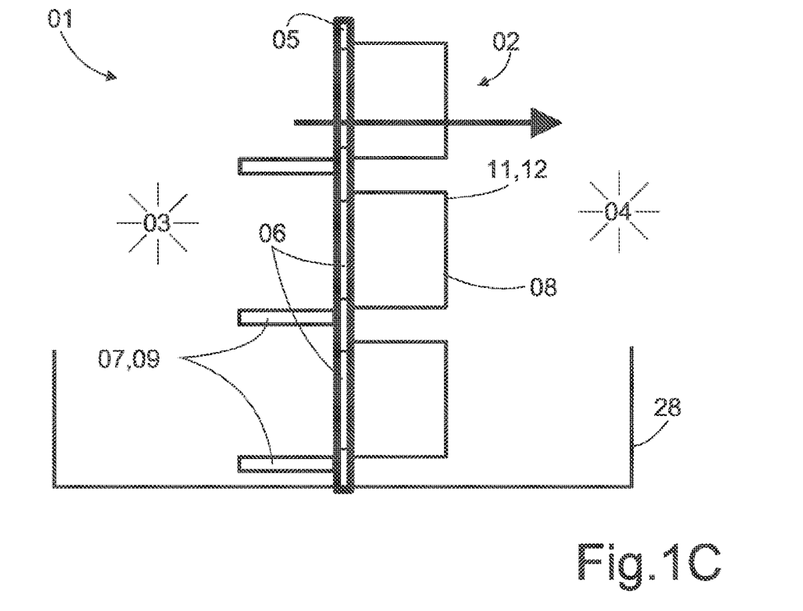
Figure 1D:
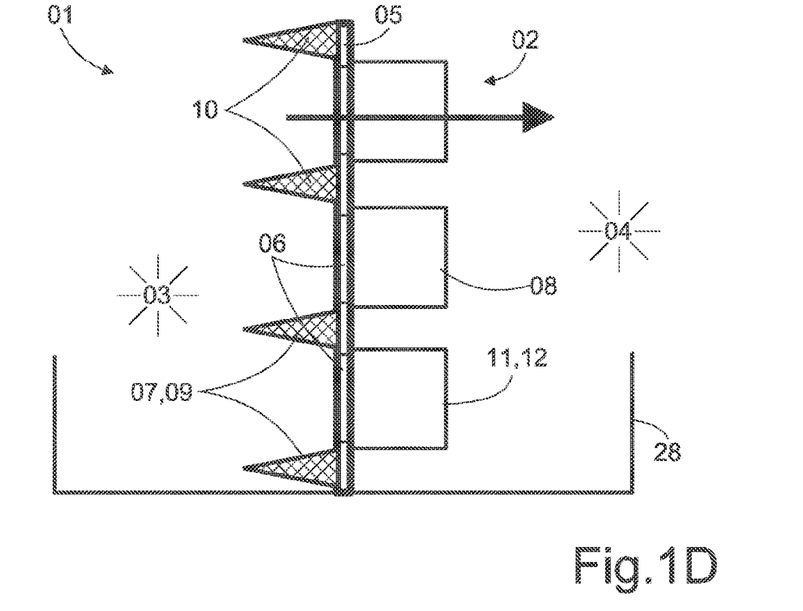

FIG. 1A to 1D show a sorting device 01 in a water tank 28 for live aquatic animals, in particular shrimp, in the region of a vertical passage device 02 in the first embodiment. FIG. 1A shows a perspective front view (from the passage-facilitating region 03); FIG. 1B shows a perspective rear view (from the passage-obstructing region 04). FIG. 1C shows a side view with a first embodiment of the climbing aid 09; FIG. 1D shows a second embodiment. The passage device 02 is shown within an indicated water tank 28, in which it can be installed. Possible installation types can be found, for example, in DE 10 2018 130 232 B3. The passage device 02 divides the water tank 28 into a passage-facilitating region 03 (the shrimp are unsorted here) and a passage-obstructing region 04 (the shrimp are sorted or pre-sorted here if a plurality of passage devices 02 arranged in series are provided in a water tank 28. The shrimp should swim voluntarily and stress-free from the passage-facilitating region 03 to the passage-obstructing region 04 and not swim back again as far as possible. In the first embodiment, the passage device 02 comprises a carrier plate 05, which is shown in two perspective views. It has a plurality of flat passage openings 06, which are circular in the exemplary embodiment shown and arranged in a plurality of rows and columns. The passage device 02 has guide elements 07 towards the passage-facilitating region 03, which are intended to guide the shrimp towards the passage openings 06 (see FIG. 1A). The passage device 02 has retaining elements 08 towards the passage-obstructing region 04, which are intended to prevent the shrimp from swimming back (see FIG. 1B).

In the exemplary embodiment shown, the guide elements 07 are designed as climbing aids 09, which are arranged substantially horizontally. These are intended to enable the shrimp to climb up the carrier plate 05 so that all passage openings 06 can be used by the animals. The climbing aids 09 can, for example, be plate-shaped (see FIG. 1C) or wedge-shaped (see FIG. 1D). In the wedge-shaped design of the climbing aids 09, triangular screens 10 are arranged on the front sides and enable water to flow through the climbing aids 09, but retain the shrimp. Further embodiments for the climbing aids 09 can be found, for example, in DE 10 2010 021 606 B4. Furthermore, the retaining elements 08 are designed as surrounding, i.e. closed, walls 11, which follow the contour of the passage openings 06. In the exemplary embodiment shown, these are short pipe sockets 12 with a circular cross section, which surround the circular passage openings 06 (see FIG. 1B). The walls 11 have a height that is greater than the size of the crustaceans. Since the latter would then have to get over the walls 11 first, they are more likely to be prevented from moving back into the passage-facilitating region 03 and move further into the passage-obstructing region 04.

Figure 2:
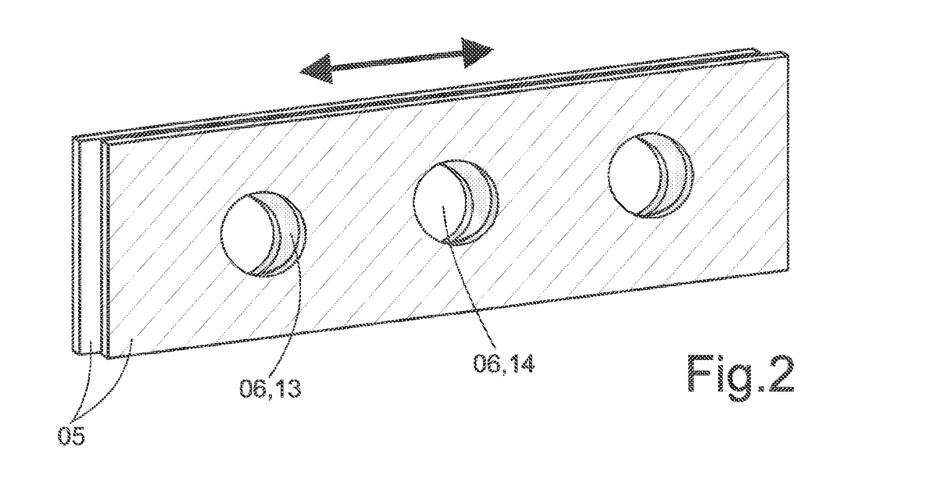
FIG. 2 shows a first detail for changing the size of passage openings.
Figure 3:
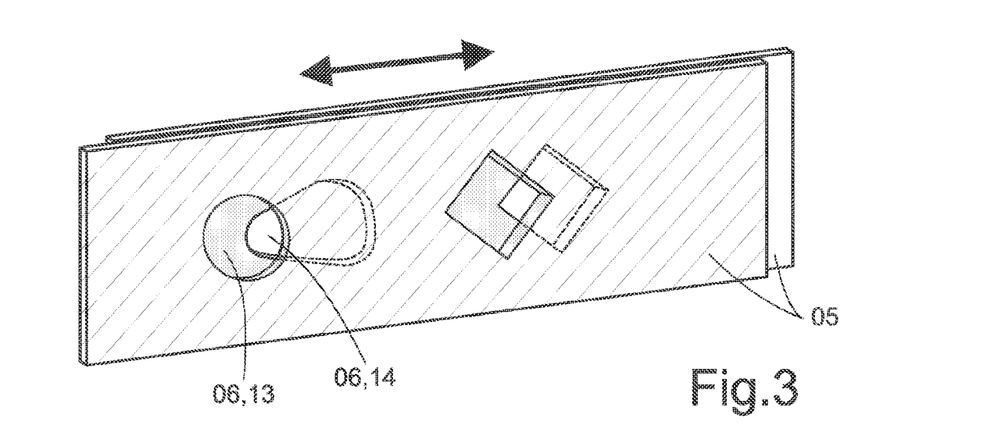
FIG. 3 shows a second detail for changing the size of passage openings.

An option for changing the size of the passage openings 06 is schematically represented in FIG. 2. Two carrier plates 05 with an identical arrangement and size of the passage openings 06 are superimposed and moved relative to one another for size variation. In this way, a large passage opening 13 can be converted into a small passage opening 14 and vice versa. In FIG. 3, other shapes of passage openings 06 are shown with size variability, wherein a size variation between the largest passage opening 13 and the smallest passage opening 14 is respectively shown. By way of example, the passage openings 06 can be rhombic. Here too, the size can be easily adjusted by moving two carrier plates 05. Furthermore, it is also possible to provide two carrier plates 05 with differently shaped passage openings 06, e.g. a circular and an irregular, pear-shaped passage opening 06. The overlapping then results in irregular passage openings 13, 14, the size of which can be adjusted very precisely.

Small passage openings 13, 14, the size of which is adapted precisely to the shrimp, are required especially for shrimp. Moreover, it is very useful when reducing the size of the passage opening 06, to keep the ratio of height and width of the passage opening 13 as constant as possible. This ratio ideally remains constant especially for square passage openings 06.

Figures 4A, 4B:
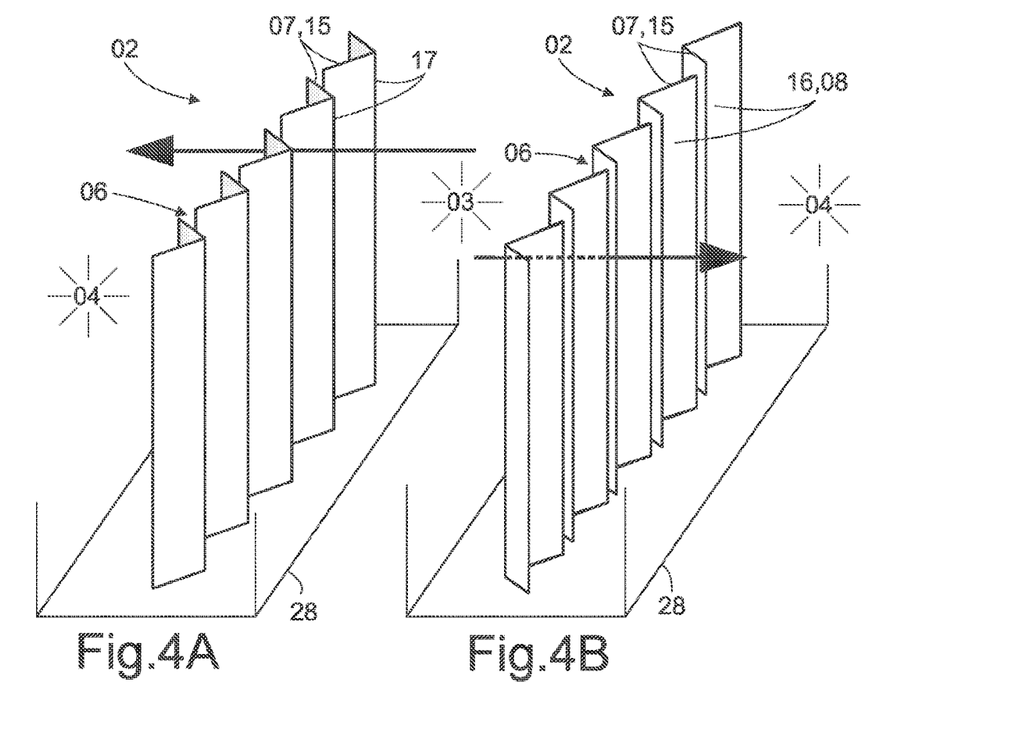
FIGS. 4A to 4C show a sorting device.
Figure 4C:
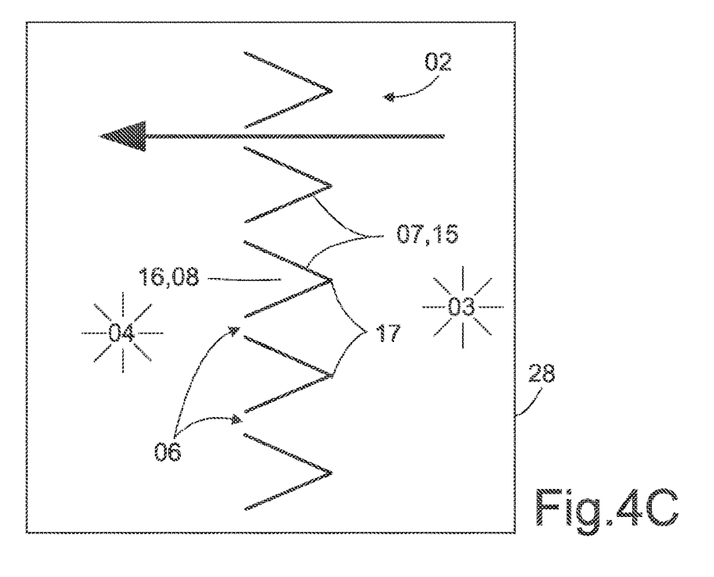

In FIG. 4A to 4C, the passage device 02 for the sorting device 01 in a water tank 28 is schematically illustrated in the second embodiment. FIG. 4A shows a perspective front view (from the passage-facilitating region 03); FIG. 4B shows a perspective rear view (from the passage-obstructing region 04). FIG. 4C shows a schematic plan view. Vertical angular sections 15 are illustrated as guide elements 07 in FIG. 4A. These have an invariable acute inner angle 16 and an invariable large outer angle 17. The outer angles 17 are on the side of the passage-facilitating region 03, and the inner angles 16 are on the side of the passage-obstructing region 04. The passage openings 06 with a gap-shaped form are respectively formed between adjacently arranged angular sections 15 and extend over the entire height of the angular sections 15. The inner angles 16 form the retaining elements 08. The shrimp swim into them and miss the gap-shaped passage openings 06.

Figure 5:
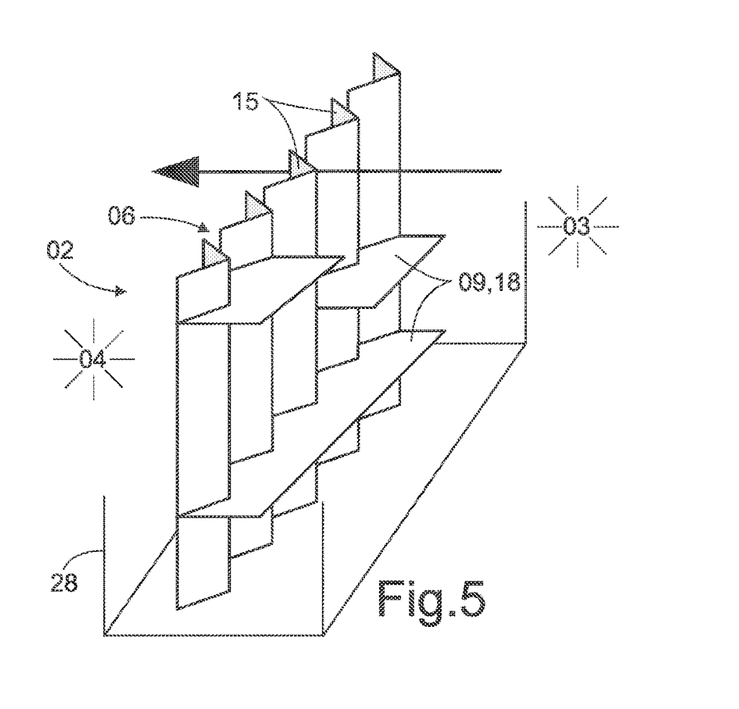
FIG. 5 shows a detail in the region of climbing aids.

FIG. 5 shows the passage device 02 according to FIG. 4A (perspective front view, from the passage-facilitating region 03) with horizontal climbing aids 09. In the exemplary embodiment shown, these are simple flat bars 18, which are arranged in different planes in sections or continuously across one or a plurality of angular sections 15.

Figure 6:
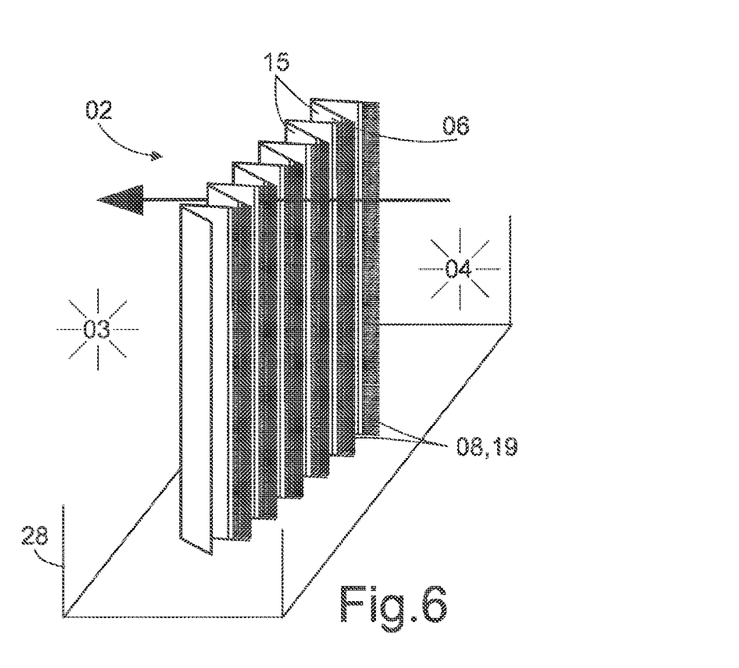
FIG. 6 shows a detail in the region of retaining elements.

FIG. 6 shows the passage device 02 according to FIG. 4B (perspective rear view, from the passage-obstructing region 04) with additional retaining elements 08. These are soft, flexible brush strips 19, which are respectively arranged on the right and left of the gap-shaped passage openings 06. They are fixed in extension of the legs of the angular sections 15 and narrow the gap-shaped passage openings 06 such that swimming back can be prevented. When the shrimp swim through, the brush strips do not hinder the shrimp, but bend back and brush lightly along their sides.

Figure 7:
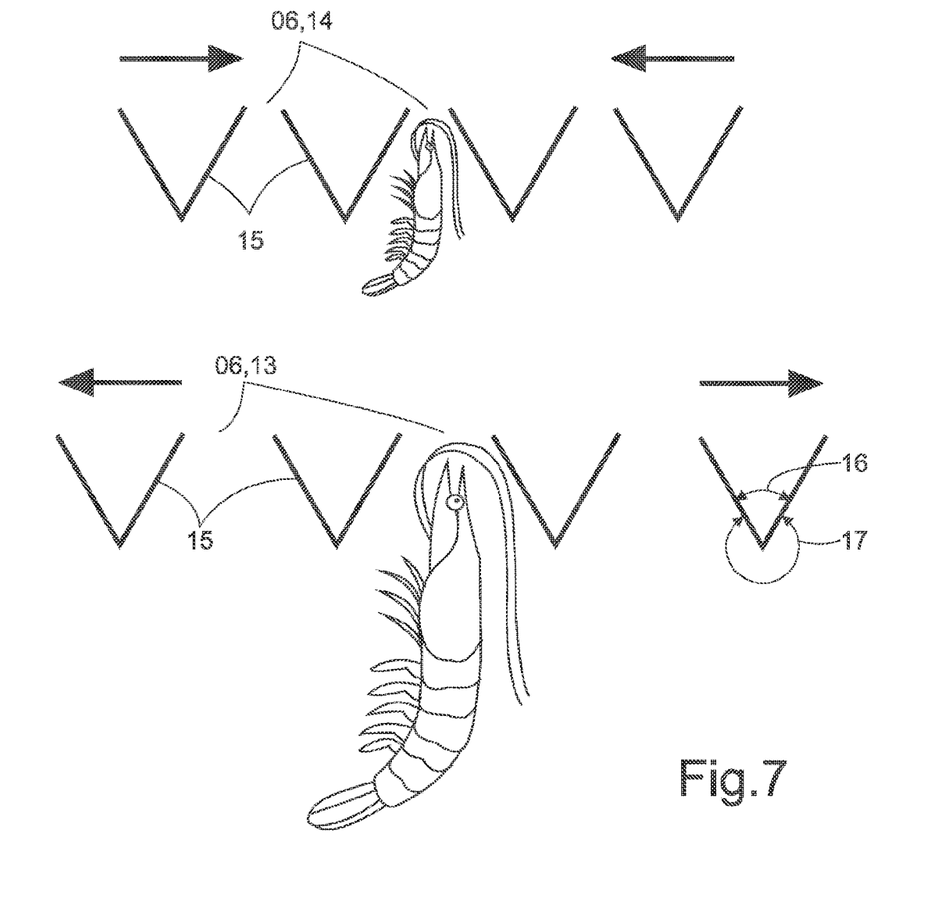
FIG. 7 shows a detail for changing the size of passage openings.

FIG. 7 schematically shows the changeability of the width of the gap-shaped passage openings 06 in the second embodiment with rigid angular sections 15. The changing gap width between a maximum passage opening 13 and a minimum passage opening 14 is achieved by a correspondingly changed spacing between adjacent angular sections 15, wherein the inner angles 16 and the outer angles 17 are constant.

Figures 8A, 8C:
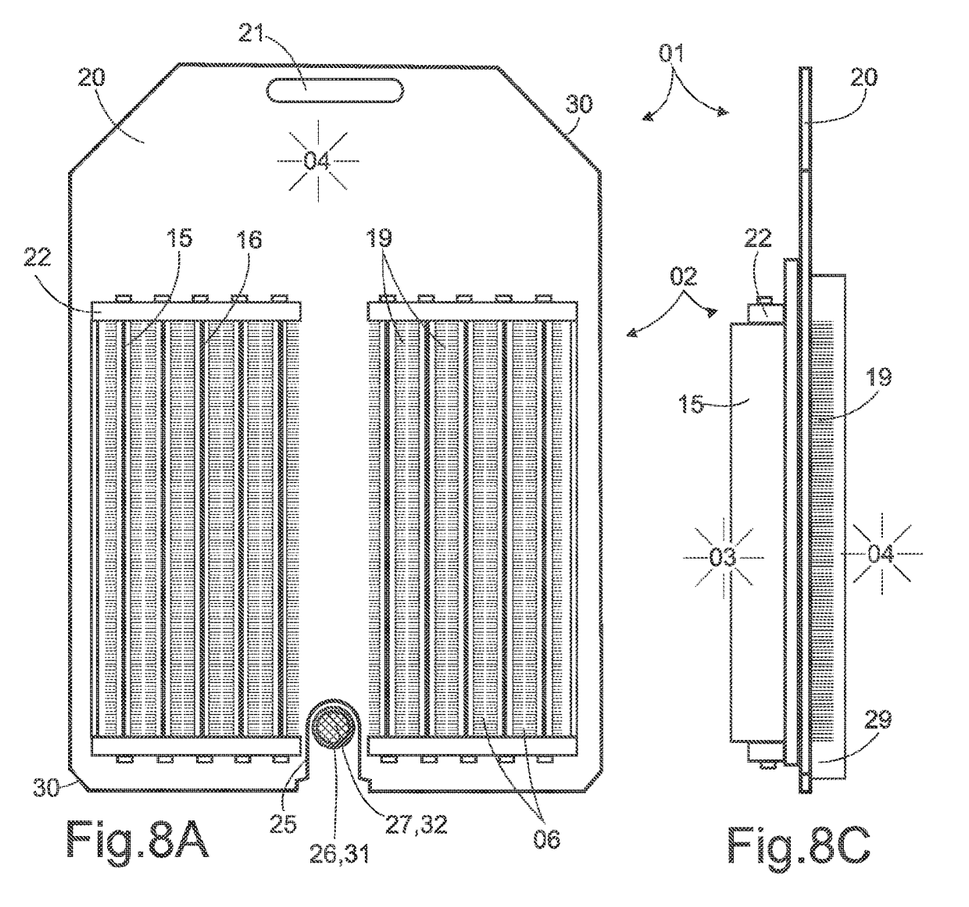
FIGS. 8A to 8C show a structurally developed sorting device.
Figure 8B:
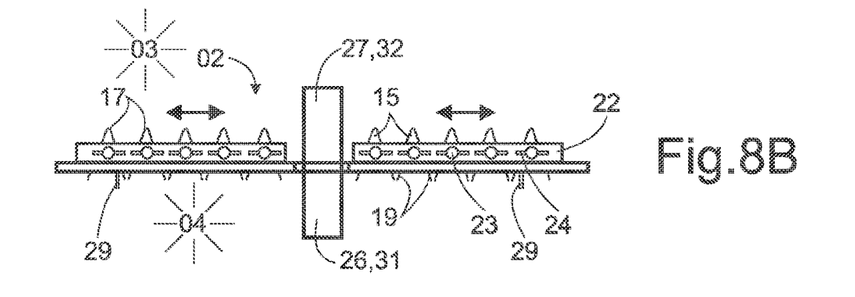

FIG. 8A to 8C show the device 01 with the passage device 02 according to the second embodiment in detail for the installation in a water tank 28 in the view (FIG. 8A, from the passage-obstructing region 04), plan view (FIG. 8B) and side view (FIG. 8C). An insertion plate 20 with a handle 21 for insertion into a water tank is illustrated. Bevelled corners 30 facilitate the insertion and removal as well as the fixing of the insertion plate 20 into the water tank 28 or adapt to the shape of the water tank 28. Furthermore, the angular sections 15 (view into the inner angles 16) with the flexible brush strips 19 can be seen. The gap-shaped passage openings 06 extend vertically between the brush strips 19. The plan view shows the angular sections 15, which point towards the passage-facilitating region 03 with their outer angles 17. Furthermore, an adjustment device 22 for changing the gap width of the passage openings 06 is shown. The angular sections 15 are connected with locking screws 23, which can be moved and clamped in an oblong hole 24. In this way, the angular sections 15 can be moved sideways and fixed very easily. The gap width of the passage openings 06 can be set to constant or different widths. In the case of a constant setting, all angular sections 15 can also be moved together or in groups via adjustment levers 29. A recess 25 is provided in the centre of the insertion plate 20 of the passage device 02. A flow element 26 is located therein and facilitates the unhindered water exchange between the passage-facilitating region 03 and the passage-obstructing region 04. In the exemplary embodiment shown, the flow element 26 is a simple tube 31. At its end towards the passage-obstructing region 04, the tube 26 is covered with a mesh screen 32 as a passage barrier 27 in order to retain the shrimp. Other embodiments of the flow element 26 and passage barrier 27 are also possible. They just have to satisfy the functions of undisturbed water circulation whilst at the same time preventing the animals from swimming through the passage device 02.

Furthermore, in the sorting device 01, a plurality of passage devices 02 can be arranged spaced apart in the water tank 28, wherein the flat or gap-shaped passage openings 06 are formed with decreasing size in the direction of the passage-obstructing regions 04. Different stimuli for attracting the shrimp can also be provided in the passage-obstructing region 04. The stimuli can be formed by a food source, a light source and/or a colouring. The passage device 02 can have a light colouring towards the passage-facilitating region 03 and/or a dark colouring towards the passage-obstructing region 04. With respect to these embodiments, reference is made to the exemplary embodiments of DE 10 2018 130 232 B3. The structural and dimensional design of the passage device 02 of the sorting device 01 is respectively subject to the requirements in the respective application. The circular passage openings 06 can have a diameter in a range of up to 30 mm, the climbing aids 09 can have a height in range of 100 mm, the walls 11 can have a height in a range of 50 mm and a diameter in a range of 28 mm, the angular sections 15 can have an opening width in a range of 45 mm and a leg length in a range of 80 mm and/or the gap-shaped passage openings 06 can have a width in a range of 10 mm.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

01 Sorting device
02 Passage device
03 Passage-facilitating region
04 Passage-obstructing region
05 Carrier plate
06 Passage opening
07 Guide element
08 Retaining element
09 Climbing aid
10 Screen
11 Wall
12 Pipe socket
13 Passage opening (max)
14 Passage opening (min)
15 Angular section
16 Inner angle from 15
17 Outer angle from 15
18 Bar
19 Brush strip
20 Insertion plate
21 Handle
22 Adjustment device
23 Locking screw
24 Oblong hole
25 Recess
26 Flow element
27 Passage barrier
28 Water tank
29 Adjustment lever from 22
30 Bevelled corner from 20
31 Tube as 26
32 Mesh screen as 27

The invention claimed is:

1. A device for voluntary self-sorting of live aquatic animals, comprising:
at least one passage device, by which a water tank is divided into a passage-facilitating region and a passage-obstructing region, the at least one passage device comprising a carrier plate,
wherein the at least one passage device has a plurality of passage openings in the carrier plate that are adaptable in size to the aquatic animals to be sorted,
wherein the at least one passage device comprises guides that protrude from the carrier plate towards the passage-facilitating region and retainers that protrude from the carrier plate towards the passage-obstructing region,
wherein the guides comprise climbing aids and the retainers comprise walls adapted to a contour of the passage openings, and
wherein the passage openings are flat and arranged in the carrier plate, and have a height that is larger than a height of the aquatic animals to be sorted.

2. The device according to claim 1,
wherein the at least one passage device is arranged vertically and/or the climbing aids are arranged horizontally.

3. The device according to claim 1,
wherein the climbing aids are plate-shaped or wedge-shaped.

4. The device according to claim 1, wherein the passage openings are regularly circular or rectangular or irregular in shape.

5. The device according to claim 1, wherein a size of the passage openings is adjustable by two carrier plates with passage openings, and
wherein the carrier plates are displaceable relative to one another in the at least one passage device.

6. A device for voluntary self-sorting of live aquatic animals, comprising:
at least one passage device, by which a water tank is divided into a passage-facilitating region and a passage-obstructing region, the at least one passage device comprising a carrier plate,
wherein the at least one passage device has a plurality of gap-shaped passage openings in the carrier plate that are adaptable in size to the aquatic animals to be sorted,
wherein the at least one passage device comprises guides adjacent to one another that protrude from the carrier plate towards the passage-facilitating region and retainers that protrude from the carrier plate towards the passage-obstructing region,
wherein outer angles of the guides point towards the passage-facilitating region,
wherein the retainers are formed by inner angles of the guides,
wherein the guides comprise angular sections with an invariable inner angle and an invariable outer angle, and
wherein a width of the gap-shaped passage openings is adjustable by a spacing of adjacent angular sections.

7. The device according to claim 6, wherein the angular sections comprise climbing aids, and
wherein the climbing aids are extendible over a plurality of angular sections arranged next to one another.

8. The device according to claim 7, wherein the angular sections are arranged vertically and/or the climbing aids are arranged horizontally.

9. The device according to claim 7, wherein the angular sections have flexible brush strips as additional retainers towards the passage-obstructing region on both sides of the gap-shaped passage openings.

10. The device according to claim 1, wherein a flow element is provided in the at least one passage device for water exchange between the passage-facilitating region and the passage-obstructing region, and
wherein the flow element comprises a passage barrier so as to prohibit the aquatic animals from passing the flow element.

11. The device according to claim 10, wherein the flow element comprises a tube and the passage element comprises a mesh screen.

12. The device according to claim 1, wherein the at least one passage device is modular for adapting to different water tanks.

13. The device according to claim 1, wherein the at least one passage device comprises a plurality of the passage devices arrangeable spaced apart in a water tank, and
wherein the passage openings are formed with decreasing size in a direction of the passage-obstructing regions.

14. The device according to claim 1, wherein the at least one passage device has a light colouring towards the passage-facilitating region and/or a dark colouring towards the passage-obstructing region.

15. The device according to claim 1, wherein the live aquatic animals are crustaceans.

16. The device according to claim 15, where the crustaceans are shrimp.

17. The device according to claim 1, wherein the device is arranged in a water tank, and
wherein different stimuli for attracting the live aquatic animals are provided in the at least one passage-obstructing region.

18. The device according to claim 17, wherein the stimuli are formed by a food source, a light source and/or a colouring.

* * * * *